Aug. 17, 1926.
N. ABRAMSON
1,596,788
PNEUMATIC CUSHIONED WHEEL
Filed May 28, 1926    2 Sheets-Sheet 1
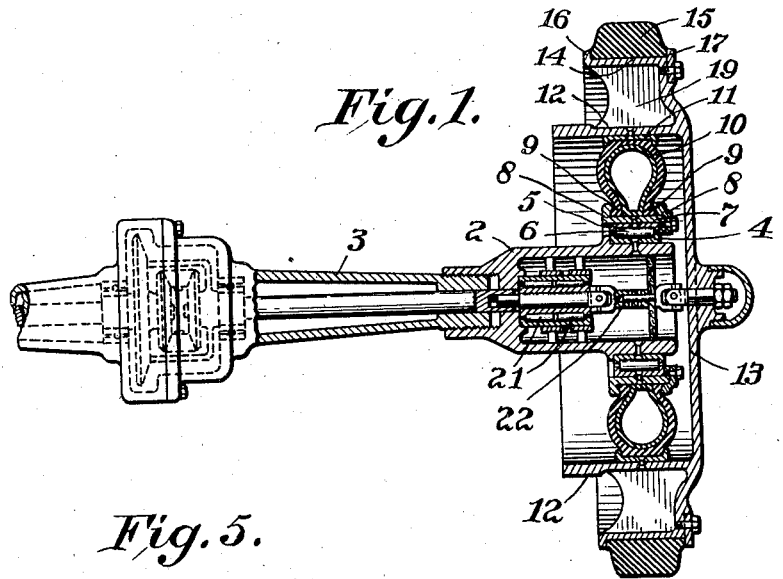
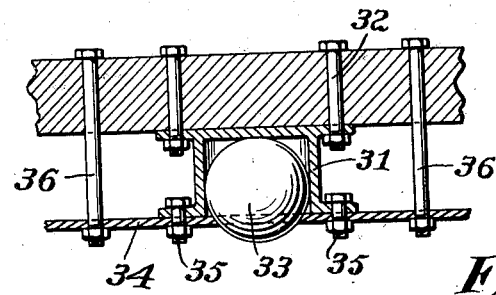
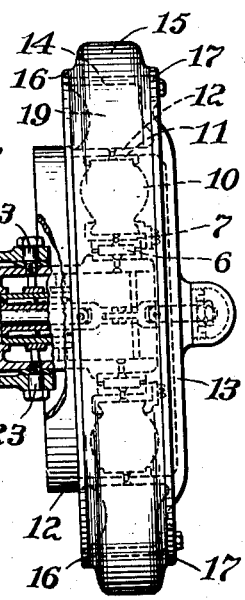
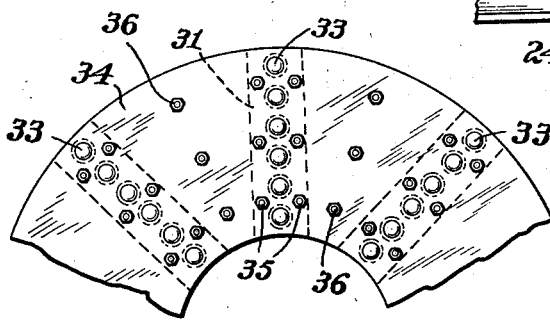
Inventor:
Nathan Abramson,
by Spear, Middleton, Donaldson & Hall
Attys.

Aug. 17, 1926.  
N. ABRAMSON  
1,596,788  
PNEUMATIC CUSHIONED WHEEL  
Filed May 28, 1926  2 Sheets-Sheet 2
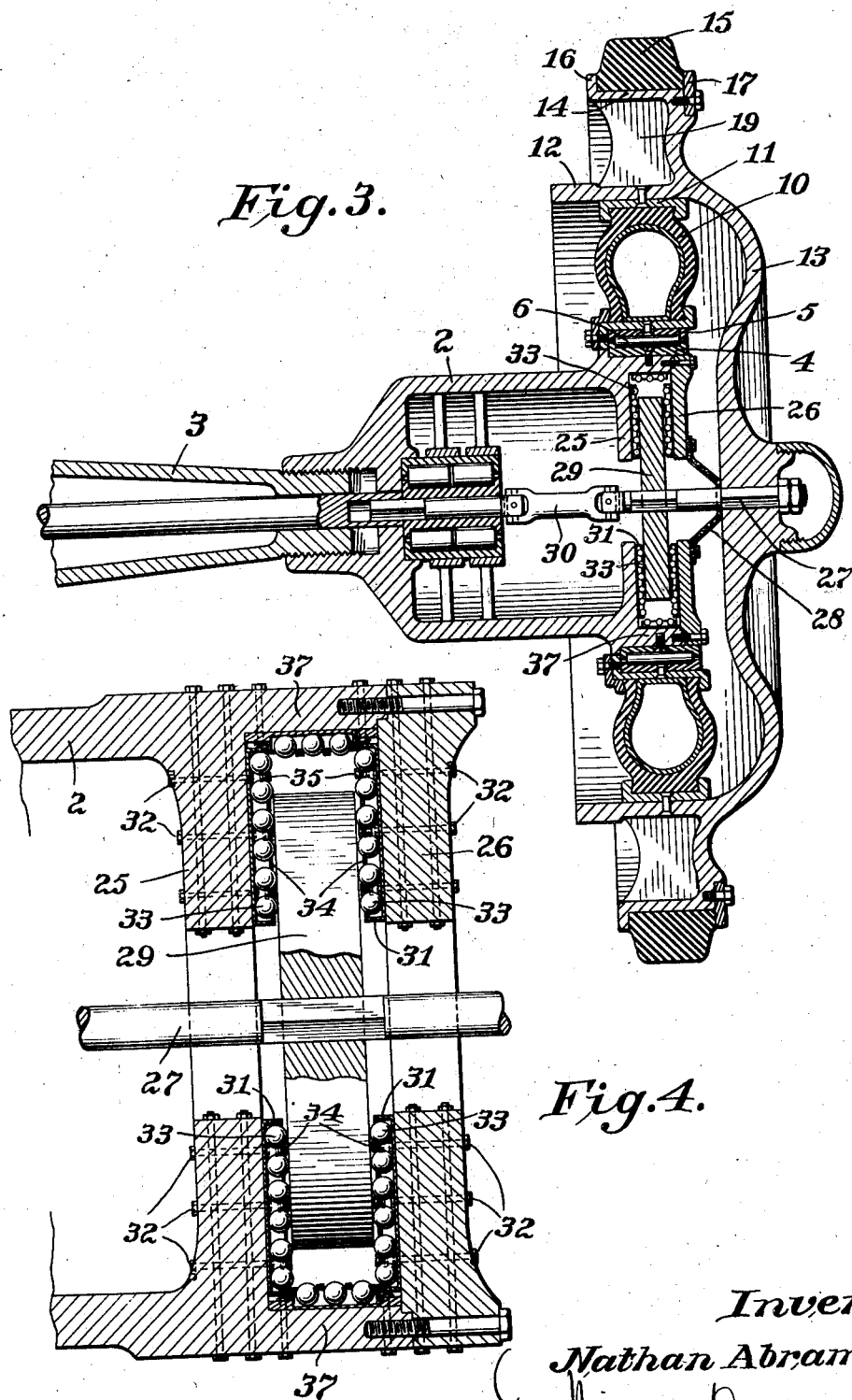
Inventor:  
Nathan Abramson,  
by Jean Middleton Donaldson Hall  
Attys.

Patented Aug. 17, 1926.

1,596,788

UNITED STATES PATENT OFFICE.

NATHAN ABRAMSON, OF LAFAYETTE, LOUISIANA.

PNEUMATIC CUSHIONED WHEEL.

Application filed May 28, 1926. Serial No. 112,325.

This invention comprises a pneumatic cushioned wheel for automobiles in which a solid rubber tire is mounted on the frame or body of the wheel and has traction contact with the roadway, a pneumatic cushion being interposed between the main body or frame of the wheel and a housing forming a part of the car frame. Suitable means are provided to take and sustain the weight of the car on the wheel in case the pneumatic element becomes deflated.

The invention is shown in the accompanying drawings in which,

Figure 1 is a vertical sectional view of a driving wheel of a vehicle, embodying my invention.

Figure 2 is a similar view as applied to a front wheel.

Figure 3 is similar view of a modified form of invention.

Figure 4 is a view partly in section showing the mounting for the bearings of the stabilizer wheel.

Figure 5 is a sectional plan view of one of the bearing cases.

Figure 6 is an elevation of the bearing case disc.

In these drawings and referring to Figure 1, the numeral 2 indicates a cylindrical housing forming an enlarged extension of the rear axle housing 3.

This housing has an anti-friction roller track or raceway member 4, encircling it near its outer end and the complementary raceway member 5 encircles the raceway member first mentioned, and between these members are located anti-friction rollers 6.

The raceway member 5 is attached to a channel band or inner rim or ring 7 having flanges 8 to receive beads 9 of the pneumatic cushion 10, which is in the form of a continuous ring like a tire. This ring-shaped cushion at its outer edge or periphery fits in a channel of a metal rim or ring 11 which is attached to the inner side of a circular flange 12 formed on the main frame or plate 13 of the wheel. The flange 12 may be used as a brake drum. This main wheel member or plate has an annular seat about its outer portion at 14 for a solid tire 15. This may be seated between a permanent flange 16 and a removable ring 17. The seat flange 14 may be braced from the main body of the wheel by brackets 19. Any ordinary forms of clamping rings may be employed to hold the pneumatic cushion in place.

The driving rear axle passes through the ordinary housing and through suitably disposed roller bearings in the enlarged housing indicated at 21. This drive shaft has a section 22 at its outer end for connection with the main member or plate of the wheel, and this section would have suitable universal joint and compensating connection to accommodate the movement of the wheel from its coaxial relation to the housing due to the give of the cushion so that while the wheel can assume positions eccentric to the housing due to the resilient cushion 10, the driving connection with the shaft is maintained.

In Fig. 3 is shown a modified form of device having particular reference to means for maintaining the wheel at right angles to the axle and for carrying the weight of the wheel should the pneumatic tire be deflated.

In this figure the housing 2 is provided with radially extending walls 25 and 26 having an axial opening therein to accommodate the axle extension 27.

A leather shoe 28 secured to wheel member 13 and wall 26 serve to keep dirt and grit from the universal joints and associated parts.

To the axle extension 27 I secure a stabilizer wheel 29 which comprises a solid steel disc extending radially into the space between walls 25 and 26. The axle extension 27 is attached to the main drive as by means of universal joint 30.

To the inner surface of the walls 25 and 26 I secure in a radial direction ball cases 31 by means of bolts 32. These cases are provided with suitable apertures to receive ball bearings 33 of such a size that they make contact at substantially three points with the case. These balls are retained in the series of cases 31 by means of a circular retaining plate 34 having apertures therein through which the balls 33 project. The retaining plate 34 is secured in place by bolts 35 connecting the same to a flange on the bearing cases 31, and bolts 36 to the walls 25 and 26. The steel disc 29 is spaced between these sets of bearings so that it is maintained in its proper relation without wobbling.

The space between walls 25 and 26 is also provided with short ball cases similar to those above described secured to the portion 37 of the part 2.

In case of deflation of the pneumatic member, the steel disc 29 will receive the weight of the housing and associated parts, the housing 2 turning easily on the disc 29 by reason of the ball bearings engaging the outer periphery thereof. The wheel disc 29 being firmly held between the opposite sets of radial ball cases, no swing or wobble can take place.

In the case of the organization for the front wheel, the housing 2ª takes the place of the ordinary stub axle, for which purpose it is pivoted at 23 in a fork 23' of the front cross bar or shaft. This housing is equipped with a projection or arm 24 for connection with the steering mechanism.

The shaft section 22 may have a universal joint coupling at its outer end with the main plate or frame of the wheel and a second joint of this character where the shaft section 22 connects with the main part of the drive shaft. This shaft section 22 is made in two parts slidably connected with each other, to compensate for the movement of the wheel and car frame relative to each other.

The main part of the wheel may be cast, in which the brackets are in the form of ribs.

One of the flanges 8 for holding the pneumatic cushion in place may be removable, as shown in Fig. 1.

It will be seen that with my construction the driving power is delivered through the shaft to the wheel frame or plate and to the outer tread position where the solid tire is located and where the traction occurs. The pneumatic cushion is obviously not subjected to the same wear or liability to puncture as is the case with a pneumatic tire because it has no traction contact with the roadbed.

The pneumatic cushion provides the necessary resiliency within the wheel, but does not interfere in any way with the direct transmission of the power from the axle to the wheel and to the point therein where traction occurs.

While I have shown the invention as applicable to an automobile wheel, it is understood that I do not wish to be limited thereto. The invention contemplates a pneumatic cushioned wheel for any vehicle or contrivance using wheels or requiring an air cushion.

Where I use the word "raceway" I mean the pair of complementary parts which receive the antifriction elements therebetween.

I claim:

1. A cushion wheel construction for automobiles comprising a housing having a raceway, a pneumatic cushion surrounding said raceway, anti-friction means in the raceway, a main wheel member supporting the cushion and a solid tire carried by the main wheel member, and a drive shaft extending through the housing and a wheel disc attached to the drive axle and extending between radially extending spaced apart walls of the housing.

2. A cushion wheel construction for automobiles comprising a housing having a raceway, a pneumatic cushion surrounding said way, a pneumatic cushion surrounding said way, anti-friction means in the raceway, a main wheel member supporting the cushion and a solid tire carried by the main wheel member, and a drive shaft extending through the housing and a wheel disc attached to the drive axle and extending between radially extending spaced apart walls of the housing, said walls having bearing cases arranged radially on their interior walls, the balls in said cases engaging opposite sides of said wheel disc.

3. A cushion wheel construction for automobiles comprising a housing having a raceway, a pneumatic cushion surrounding said way, anti-friction means in said raceway, a main wheel member supporting the cushion and a solid tire carried by the main wheel member, and a drive shaft extending through the housing, and a wheel disc attached to the drive axle and extending between radially extending spaced apart walls of the housing, said walls having bearing cases arranged radially in their opposite interior walls, and adapted to engage opposite sides of said disc and additional bearing cases having balls adapted to engage the circumferential periphery of said disc.

In testimony whereof I affix my signature.

NATHAN ABRAMSON.